(12) United States Patent
Sercu et al.

(10) Patent No.: US 6,353,801 B1
(45) Date of Patent: Mar. 5, 2002

(54) MULTI-RESOLUTION ADAPTIVE SOLUTION REFINEMENT TECHNIQUE FOR A METHOD OF MOMENTS-BASED ELECTROMAGNETIC SIMULATOR

(75) Inventors: Jeannick Sercu, Ghent; Frank Libbrecht, Kortrljk, both of (BE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/288,731

(22) Filed: Apr. 9, 1999

(51) Int. Cl.[7] .................... G01R 27/00; G01R 19/00
(52) U.S. Cl. .................... 702/65; 702/65; 702/53; 702/173; 703/2; 703/3; 703/5; 716/20
(58) Field of Search ............... 702/65, 53, 173; 703/3, 2, 5; 716/20

(56) References Cited

U.S. PATENT DOCUMENTS

| | | | | |
|---|---|---|---|---|
| 4,797,842 A | * | 1/1989 | Nackman et al. | 716/20 |
| 4,933,889 A | * | 6/1990 | Meshkat et al. | 716/20 |
| 5,625,578 A | * | 4/1997 | Du Cloux et al. | 703/2 |
| 5,946,479 A | * | 8/1999 | Sakaguchi et al. | 716/20 |
| 6,182,023 B1 | * | 1/2000 | Ohtsu et al. | 703/6 |

* cited by examiner

Primary Examiner—Arthur T. Grimley
Assistant Examiner—Mohamed Charioui (57) ABSTRACT

A method for operating a computer to determine the electrical characteristics of a passive planar structure. The method starts by defining a first mesh on the structure. The first mesh divides the structure into polygons. A surface current is defined in the structure as a first weighted sum of a first set of basis functions. The weights of the first basis functions in the first weighted sum are calculated by solving Maxwell's equations. The mesh is then refined by dividing each polygon into a plurality of sub-polygons. The surface current in the sub-polygons is defined as a second weighted sum of a second set of basis functions. The second set of basis functions includes the first set of basis functions and a plurality of extension basis functions representing the additional degrees of freedom introduced by the refined mesh. The extension basis functions preferably include a capacitative set of basis functions representing the capacitative contribution of the sub-polygons and an inductive set of basis functions representing the inductive contributions of the sub-polygons. The contribution of each basis function in the capacitative and inductive sets of basis functions is estimated prior to solving Maxwell's equations in the refined level. Redundancy is eliminated by removing those capacitive basis functions whose contributions are less than a capacitative threshold value and those inductive basis functions whose contributions are less than an inductive threshold value.

6 Claims, 6 Drawing Sheets

MULTI-RESOLUTION ADAPTIVE SOLUTION REFINEMENT TECHNIQUE FOR A METHOD OF MOMENTS-BASED ELECTROMAGNETIC SIMULATOR

FIELD OF THE INVENTION

The present invention relates to circuit simulators, and more particularly, to circuit simulators for modeling high frequency planar circuits and interconnect structures utilizing the method of moments.

BACKGROUND OF THE INVENTION

Integrated circuits for use at high frequencies often include high frequency interconnections such as coupled transmission lines, junctions, spirals, via's through ground planes, etc. Precise characterization of such high-frequency interconnections is very important for circuit simulation and optimization purposes. Various numerical full-wave electromagnetic analysis techniques have been used to characterize these interconnect structures. Solutions to the characterization problem based on solving Maxwell's electromagnetic (EM) equations using the method of moments (MoM) are commercially available and are well suited to the problem of characterizing planar circuits consisting of planar metallization layers embedded in a multilayered dielectric medium. Applications of such planar circuits are found in microwave monolithic integrated circuits (MMICs), printed circuit boards (PCBs), multichip modules (MCMs), hybrid microwave integrated circuits (MICs) and radio frequent integrated circuits (RFICs).

Methods based on finite element algorithms are also known to the art. However, these methods are better suited for simulating arbitrary three-dimensional structures.

The widespread use of EM simulators is hampered by two problems. First, EM simulators are very computer resource intensive. Hence, such simulators are not easily integrated into more general CAD systems. Second, a basic understanding of the underlying principles and technologies of EM simulators is a prerequisite for generating successful interconnect designs using such simulators. The designer using the EM tool must have some understanding of the underlying method of moments technology. The user himself has to initialize the mesh parameters (number of cells/wavelength, number of cells/transmission line width, edge meshing on/off, etc.). Setting these parameters is always a trade off between simulation accuracy and simulation speed. The larger the number of cells, the more accurate the solution, but the longer it will take to obtain this solution.

Setting the correct tradeoff is complicated by the lack of accuracy information. The state-of-the-art method of moments technology is not capable of giving the user any feedback on the accuracy of the solutions with respect to the discretization errors. Nor does it provide the user with any feedback regarding the relationship between the initialization of the mesh parameters and the discretization error in the solution. Currently, users of planar EM tools verify the accuracy by refining the mesh, resimulating and looking at the differences in the solutions. The burden to specify the mesh parameters and to verify the mesh accuracy is left to the user. Only EM experts with MoM expertise are able to successfully initialize the mesh parameters for a wide range of structures and obtain accurate results within a reasonable design time.

Adaptive solution refinement (ASR) technologies have been used in combination with the finite element based EM simulators. These systems utilize an algorithm that adapts and refines the mesh automatically in consecutive iterations and thereby reduce the discretization error on the output S-parameters. The mesh refinement is driven by an a-posteriori error estimation technology. Starting from an initial solution on an initial mesh, the algorithm evaluates the discretization errors and calculates error estimates. These error estimates indicate the regions in the solution domain where the discretization error is expected to be the largest. The mesh is adapted and refined only in those areas with the largest error. A new solution is built using the refined mesh and convergence of the output parameters is checked. This process is repeated until the convergence criterion is satisfied.

Unfortunately, application of such adaptive solution refinement (ASR) methods to the method of moments analysis of planar circuits is not straightforward. In finite element methods, the matrix that must be inverted is computationally cheap to create and is highly sparse. In addition, computation of the discretization error is also computationally cheap. As a result, making adaptations and refinements to the mesh can be readily accomplished without using much additional computational resource. In the method of moments, the matrix is dense and filling and solving the matrix is very expensive in terms of computer resources. Also, the integral equation operator representing Maxwell's equations is ill conditioned, and hence, the use of faster iterative matrix inverting techniques is prohibited.

Furthermore, the ASR techniques currently in use do not allow the computational work performed at one mesh level to be re-used at the next higher mesh level. Hence, such methods are computationally inefficient.

In addition, finite element ASR techniques as currently implemented utilize an error estimation driven adaptation of the mesh that is performed only at one frequency. The final mesh at this frequency is reused for simulations at all the other frequency points. In the case of resonance structures, the optimal final mesh obtained at a frequency not in the neighborhood of the resonance frequency can be much less optimal for modeling at the resonance frequency as the field distributions can change quite drastically when resonance occurs. In fact, some resonance's can be missed completely by less optimal finite element methods.

Broadly, it is the object of the present invention to provide an improved method of moments EM simulator.

It is a further object of the present invention to provide a MoM simulator that automatically refines the mesh size used in the computation until the simulation converges to a predetermined accuracy.

It is a still further object of the present invention to provide a MoM simulator that performs mesh refinement at multiple frequencies.

It is yet another object of the present invention to provide a MoM simulator that recaptures the computational work expended in prior mesh computations at each successive refinement of the mesh.

These and other objects of the present invention will become apparent to those skilled in the art from the following detailed description of the invention and the accompanying drawings.

SUMMARY OF THE INVENTION

The present invention is a method for operating a computer to determine the electrical characteristics of a passive planar structure. The method starts by defining a first mesh on the structure. The first mesh divides the structure into polygons. A surface current is defined in the structure as a first weighted sum of a first set of basis functions. The weights of the first basis functions in the first weighted sum are calculated by solving Maxwell's equations. The mesh is then refined by dividing each polygon into a plurality of sub-polygons. The surface current in the sub-polygons is defined as a second weighted sum of a second set of basis functions. The second set of basis functions includes the first set of basis functions and a plurality of extension basis functions representing the additional degrees of freedom introduced by the refined mesh. The weights of the second basis functions in the second weighted sum are calculated by solving Maxwell's equations. In the preferred embodiment of the present invention, the extension basis functions include a capacitative set of basis functions representing the capacitative contribution of the sub-polygons and an inductive set of basis functions representing the inductive contributions of the sub-polygons. The calculation of the weights in the second basis functions preferably includes solving Maxwell's equations for each polygon in the first mesh structure assuming that the currents in all other polygons in the first mesh structure remain unchanged. The step of defining the surface current in the second set of basis functions preferably includes estimating the contribution of each basis function in the capacitative and inductive sets of basis functions and removing those capacitive basis functions whose contributions are less than a capacitative threshold value and those inductive basis functions whose contributions are less than an inductive threshold value.

DETAILED DESCRIPTION OF THE INVENTION

The manner in which the present invention gains its advantages can be more easily understood with reference to the manner in which MoM systems operate to provide simulations of planar circuit elements. The reader is referred to R. Harrington, *Field Computations by Moment Methods*, Macmillan, New York, 1968, for a detailed description of the methodology. For the purposes of the present discussion, the method of moments (MoM) may be viewed as a numerical discretization technology that can be used to solve Maxwell's Equations for planar circuits. The MoM is applied to Maxwell's equations in integral equation form rather than directly to Maxwell's equations in differential form. The integrand consists of an integral kernel and an unknown physical quantity. The integral kernel is the Green's function of the layered medium in which the planar metallization structure is embedded. This Green's function describes the spatial impulse response of the unknown physical quantity. The boundary conditions require the tangential electric field components to vanish on the surface of the planar metallizations.

One commercial MoM simulator is sold under the trade name MOMENTUM by Hewlett-Packard Company. In MOMENTUM a mixed potential integral equation (MPIE) formulation is used. In this formulation, the unknowns are the electric and magnetic surface currents flowing in the planar circuit. The electric and magnetic fields are derived from a mixed vector/scalar potential representation. The surface currents (both electric and magnetic) contribute to the electromagnetic field in the circuit by means of a Green's function for the vector potential and a Green's function for the scalar potential. The latter originates from the surface charge distribution derived from the surface currents. The sources added to ports of the planar structure translate into the right hand side of the integral equation and act as the excitation source.

Using conventional notations from linear algebra, the integral equation can be written as a linear operator equation.

$$L[X(r)]=Y(r) \qquad (1)$$

Here, $X(r)$ represents the unknown surface currents and $Y(r)$ the known excitations. $L[\ ]$ denotes the integral operator.

Eq. (1) can be solved for the unknown quantity $X(r)$ by applying the method of moments (MoM). The MoM is a numerical discretization technique which builds a discrete approximation $X^{(N)}(r)$ for the unknown quantity $X(r)$. The residual error of the approximation is defined as:

$$R(r)=Y(r)-L[X^{(N)}(r)] \qquad (2)$$

The problem of solving the Eq. (1) can be reformulated as the problem of finding the quantity $X(r)$ that gives a residual error identical to zero in each point of the solution domain. Since for practical problems, the integral equation cannot be solved in an exact analytical way, only approximated solutions can be built, yielding residual errors which may differ from zero in some or all points of the solution domain.

The algorithm used in MOMENTUM basically consists of three major steps:

Step 1 Discretization: meshing of the planar metallization layers and generation of the basis functions.

Step 2 Loading: computation of all electromagnetic interactions between the basis functions and filling the interaction matrix and the excitation vector.

Step 3 Solving: computation of the current expansion coefficients by solving the interaction matrix equation.

The calculation of the spatial impulse responses or the Green's functions of the layered medium is done as a separate preprocessing step. Fitting models for the resulting Green's functions are stored in the substrate database and are used during the loading of the interaction matrix. In the discretization step, the geometry of the planar metallization layers is discretized, or meshed up, using rectangular and triangular cells. A finite number N of subsectional basis functions $B_1(r), \ldots, B_N(r)$ are defined over the mesh. They form the basis B of the discrete space in which the unknown surface current is approximated:

$$X(r) \approx X^{(N)}(r) = \sum_{j=1}^{N} I_j B_j(r) \quad (3)$$

Figure 1:
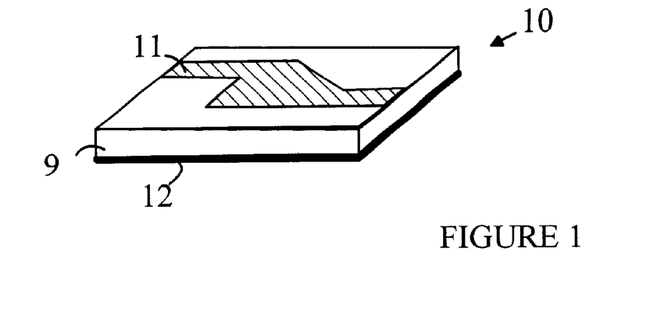
FIG. 1 is a perspective view of a planar interconnection structure that can be analyzed utilizing the method of the present invention.
Figure 2:
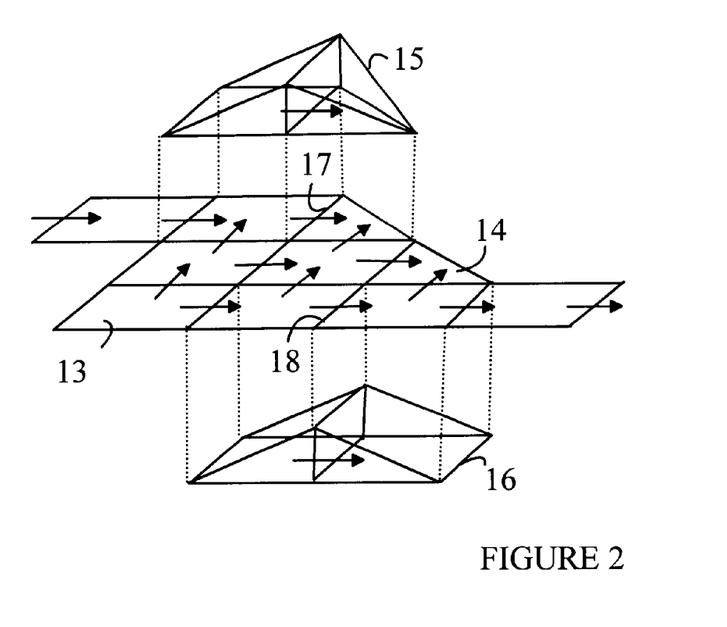
FIG. 2 illustrates the division of the transmission structure shown in FIG. 1 into cells and the shape of the rooftop basis functions used to model the surface current.

The standard basis functions used in planar EM simulators are the subsectional rooftop functions defined over the rectangular and triangular cells into which the planar structure being simulated is divided. Referring to FIG. 1, The present invention generates the parameters that describe a planar structure shown at 10 consisting of top and bottom conductors shown at 11 and 12 that sandwich a dielectric layer 9. Referring to FIG. 2, at any given stage of the simulation, structure 10 is simulated by dividing it into a number of cells that are either rectangular or triangular. Exemplary rectangular cells are shown at 13, and exemplary triangular cells are shown at 14. A rooftop basis function is associated with each cell or adjacent pair of cells. Each rooftop basis function is associated with one edge of the mesh and represents a current with constant density flowing through that edge. Exemplary basis functions are shown at 15 and 16. The corresponding edges are shown at 17 and 18, respectively. The unknown amplitudes $I_j$, j=1, ..., N of the basis functions determine the currents flowing through all the edges of the mesh.

The Eq. (1) is discretized by inserting the rooftop expansion (3) of the currents. By applying the Galerkin testing procedure, that is, by testing the integral equation using test functions identical to the basis functions, the continuous integral equation is transformed into a system of linear equations:

$$\text{for } i = 1, \ldots, N: \sum_{j=1}^{N} Z_{i,j} I_j = V_i \text{ or } [Z] \cdot [I] = [V] \quad (4)$$

with
$Z_{i,j} = <B_i(r), L[B_j(r)]>$
$V_i = <B_i(r), Y(r)>$
Here, <,> represents the Galerkin test operator. The matrix [Z] is called the interaction matrix, as each element in this matrix describes the electromagnetic interaction between two rooftop basis functions. The vector [V] represents the discretized contribution of the excitations applied to the circuit. Discretizing the residual error gives:

$$\text{for } i = 1, \ldots, N: \Delta V_i = \langle B_i(r), R(r) \rangle = V_i - \sum_{j=1}^{N} Z_{i,j} I_j \quad (5)$$

or $[\Delta V] = [V] - [Z] \cdot [I]$

The solution vector, [I], of the discrete matrix equation yields the current amplitudes, which force the discrete residual error to zero.

The loading step of the MoM process consists of the computation of all the electromagnetic interactions between the basis functions and the filling of the interaction matrix and the excitation vector. It is important to note that the interaction matrix as defined in the rooftop basis is a dense matrix, i.e. each rooftop function interacts with each other rooftop function. The strength of the electromagnetic interaction between two basis functions is determined by their relative position and their length scale. The matrix filling process in step 2 is a process having a computational workload of order $N^2$.

In the solving step, the system of linear equations is solved for the amplitudes $I_j$, j=1, ..., N of the rooftop basis functions. Once the currents are known, the field problem is solved because all physical quantities can be expressed in terms of the currents. In MOMENTUM, the system of linear equations is solved with a standard matrix factorization technique; hence, step 3 is a process having a computational workload of order $N^3$.

Finally, in a post-processing step, the scattering or S-parameters of the circuit are derived from the currents. A calibration procedure is needed to remove the parasitic effects of the excitation.

If the solution does not provide the required accuracy, the user must define a new, finer mesh, and the process is repeated. The basis functions on the finer mesh differ from those on the previous mesh; hence, all of the new matrix entries must be computed from scratch.

Figure 3:
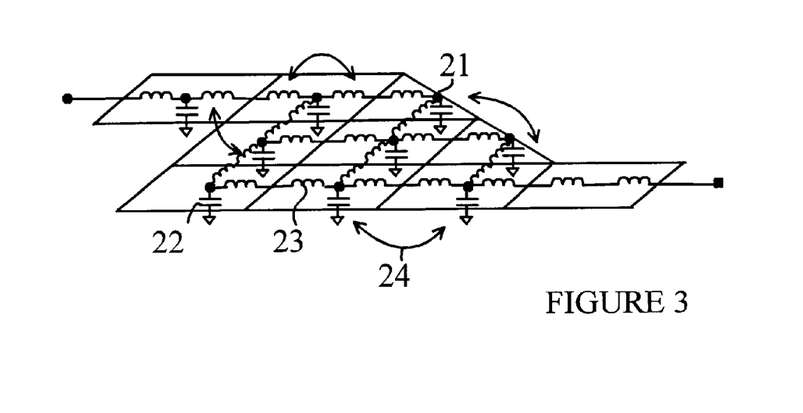
FIG. 3 is the network equivalent of the discretized transmission structure shown in FIG. 2.

Referring to FIG. 3, the discretized interaction matrix equation can be given an important physical interpretation by constructing an equivalent network model as shown at 20. In this network, the nodes correspond to the cells in the mesh and hold the cell charges on the grounded capacitors. An exemplary node is shown at 21, and an exemplary capacitor is shown at 22. All nodes are connected with branches, which carry the current flowing through the edges of the cells. Each branch has an inductor representing the magnetic self coupling of the associated basis function. An exemplary inductor is shown at 23. All capacitors and inductors in the network are mutually coupled as all basis functions interact electrically and magnetically. The magnetic interaction between the inductors and the electric interaction between the capacitors is indicated by the arrows 24. The method of moments interaction matrix equation follows from applying the Kirchoff voltage laws in the equivalent network. The currents in the network follow from the solution of the matrix equation and represent the amplitudes of the basis functions.

The present invention avoids the problems of the prior art MoM systems by utilizing a combination of a new set of basis functions and an ASR technique that operates at each of a plurality of user chosen frequencies. The set of basis functions used in the discretization process is built up in a hierarchical way, that is, refinement of the solution is achieved by adding new basis functions, while keeping the old basis functions active. This is different from the ASR methods used in finite element algorithms in that the finite element algorithms do not preserve the basis functions from one iteration step to the next. The hierarchical basis of the present invention allows for reuse of the interaction matrix from a previous iteration as a submatrix in the next iteration step, thereby reducing the matrix fill time.

In addition, an error estimation process is utilized to limit the number of basis functions that must be added at each level of refinement. For example, consider a rectangular cell that is refined by dividing the cell into 4 sub-cells. This cell is described by 4 rooftop basis functions prior to the refinement. After refinement, 12 new rooftop basis functions are needed. The present invention transforms these basis functions to a new basis in which the contributions of each of the basis functions to the solution can be estimated. Only basis functions that are actually needed at the refined level are included in the solution at that level. Hence, the present invention further reduces the computational complexity of the solution.

The multi-resolution nature of the basis functions speeds up the matrix-vector product, which is essential in the calculation of the field distribution from the currents. In a single-resolution basis, the algorithm for calculating the matrix-vector product is of order $N^2$, N being the dimension of the matrix. In a multi-resolution basis, at large distances the field contributions from the lower resolution basis functions dominate. This is due to the smooth properties of the long-distance Green's functions. By neglecting the higher resolution basis functions in the calculation of the far field, the matrix-vector product can be realized in order Np computation steps, with 1<p<2. The value of p depends on the geometrical complexity and the size of the planar structure and the resolution of the discretization. It typically decreases as the resolution is enhanced and/or the size is increased.

In addition, the present invention utilizes a discretized solution space that is decomposed in a capacitive and an inductive subspace. This is accomplished by transforming the classical rooftop basis functions into a new basis, referred to as the star-loop basis. Star basis functions are constructed by modeling an outward current flow from a cell, thereby maximizing the magnitude of the surface charge density build-up in the cell. This models the capacitive properties of the cells in the mesh. Loop basis functions are constructed by adding all rooftop functions in a closed loop within the mesh. They model the inductive properties of the solution. As will be explained in more detail below, the transformation to the star-loop basis allows the method of the present invention to eliminate some of the basis functions on the refined mesh, and hence, reduces the computational workload required to generate the interaction matrix and excitation vector. In addition, the resulting matrix problem can be solved using an iterative procedure that reduces the computational workload associated with the solution of the linear equations. Finally, the error estimates obtained in the star-loop basis are more independent of frequency than those in the roof-top basis.

Having provided an overview of the present invention, the manner in which the present invention operates will now be discussed in more detail. The present invention generates, in an iterative and adaptive way, a series of S-parameter models $S^{(0)}, S^{(1)}, \ldots, S^{(n)}$ for a given planar circuit. The iterative process is stopped automatically when this series converges within a user-specified accuracy limit. Each S-parameter model $S^{(n)}$ is derived from the solution of a method of moments discretization process in a hierarchical multi-resolution basis.

The MoM process starts by discretizing the geometry and generating the initial mesh $M^{(0)}$ and the initial basis $B^{(0)}$. The mesh parameters needed to generate the initial mesh are chosen automatically such that the mesh resolution is approximately 5 to 10 cells/wavelength. This corresponds to the minimal resolution needed to obtain physical meaningful results. The basis $B^{(0)}$ consists of the rooftop basis functions defined over the mesh $M^{(0)}$. The MoM solution process proceeds with the loading of the interaction matrix equation:

$$[Z^{(0,0)}] \cdot [I^{(0)}] = [V^{(0)}] \quad (6)$$

Solving the matrix equation, yields the current expansion coefficients $[I^{(0)}]$ from which the S-parameters $S^{(0)}$ are calculated.

The solution at level 0 is then refined to determine if the solution is now sufficiently accurate. The method of the present invention continues with an error estimation process. By calculating the discrete residual error at the next higher resolution mesh, level 1, the error estimation process generates local error indicators for all the basis functions in the refined basis $B^{(1)}$ defined on the higher level mesh. The basis selection algorithm selects the basis functions on the higher resolution level to be used for the generation of the refined solution. The interaction matrix equation for the new mesh is written as an extension of the interaction matrix of the lower mesh:

$$\begin{bmatrix} Z^{(0,0)} & Z^{(0,1)} \\ Z^{(1,0)} & Z^{(1,1)} \end{bmatrix} \cdot \begin{bmatrix} I^{(0)} \\ I^{(1)} \end{bmatrix} = \begin{bmatrix} V^{(0)} \\ V^{(1)} \end{bmatrix} \quad (7)$$

Here, the interaction matrix at level 1 has been divided into sub-matrices that depend on basis functions at the various levels. The current and voltage terms have likewise been divided into vectors that depend on the currents and voltages at the various levels. Solving the extended matrix Eq. (7) in the original $B^{(0)}$ and the refined basis $B^{(1)}$, will yield the expansion coefficients for the refined solution. Convergence of the resulting S-parameters $S^{(1)}$ can then be checked against the user specified accuracy level. The process of creating a higher resolution mesh and basis, performing error estimation and building a refined solution can be repeated until the S-parameters are converged.

Figure 4:
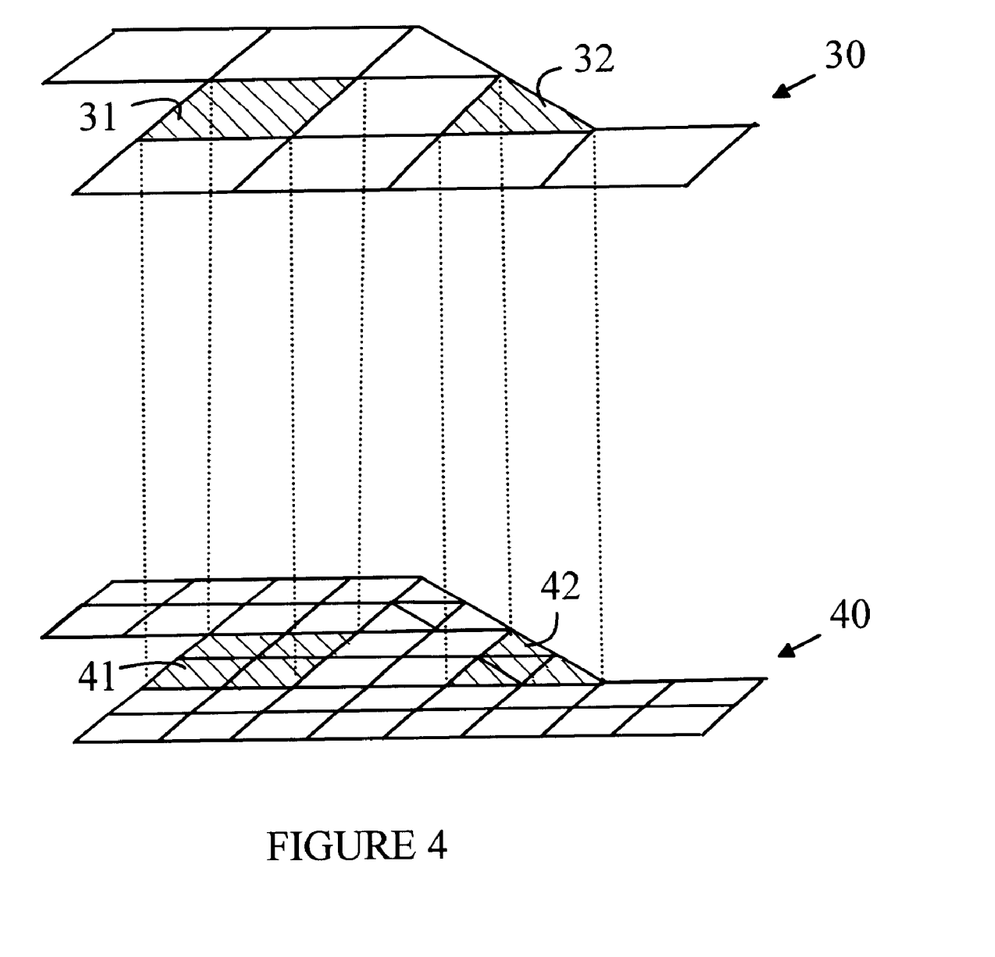
FIG. 4 illustrates the refinement of the mesh shown in FIG. 2.

In the preferred embodiment of the present invention, the refinement of a solution at one level is achieved by creating a mesh with a higher cell density and building a discrete approximation using the basis functions defined over the denser mesh. The refined mesh is generated by dividing each cell into four subcells by bisecting the edges of the cell. Referring to FIG. 4 which illustrates the refinement of the mesh shown in FIG. 2 for interconnect structure 10, the midpoint of each side of a cell is connected to the midpoint of the side opposite it. The original mesh is shown at 30, and the refined mesh obtained by the midpoint division algorithm is shown at 40 in FIG. 4. The division of an exemplary rectangular cell 31 into 4 subcells is shown at 41. Similarly, the division of an exemplary triangular cell 32 into 4 subcells is shown at 42.

Due to the hierarchical nature of the mesh refinement, the rooftop basis $B^{(n+1)}$ defined over some resolution level (n+1) mesh can always be written in terms of the rooftop basis $B^{(n)}$ defined over the next lower resolution level (n). That is, $$B^{(n+1)} = B^{(n)} + H^{(n+1)} \quad (8)$$

Here, $H^{(n+1)}$ represents the extra degrees of freedom which have been added to the resolution level (n) to obtain the next higher resolution level (n+1).

Figure 5:
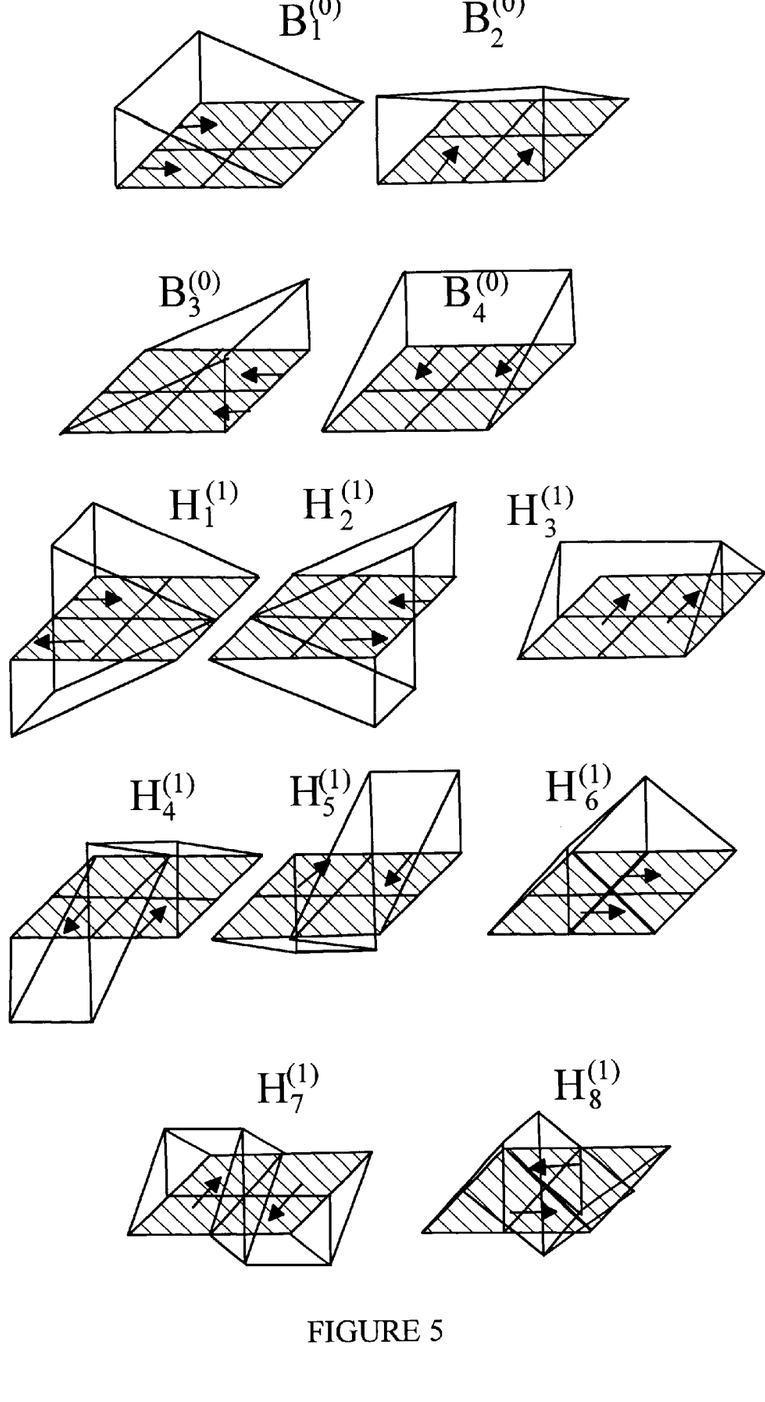
FIG. 5 illustrates the basis functions used to extend the rooftop basis.

Consider a rectangular cell at level 0. This cell is represented by 4 basis functions $\{B^0_1, B^0_2, B^0_3, B^0_4\}$ whose coefficients are the currents flowing through the 4 edges of the cell. When this cell is refined at the next level, there will be 4 subcells having a total of 16 edges. However, 4 of the edges are common to two subcells, and hence, do not give rise to independent basis functions. Accordingly, the refined cell is represented by 12 basis functions $\{B^1_1, \ldots, B^1_{12}\}$ in the rooftop basis. The present invention utilizes the observation that this basis can be transformed to a hierarchical basis containing 12 basis functions consisting of the 4 basis functions at level 0 and 8 "extension" basis functions $\{B^0_1, B^0_2, B^0_3, B^0_4, H^1_1, \ldots, H^1_8\}$. These 12 basis functions are shown in FIG. 5. It should be noted that this basis provides a solution space that is more computationally efficient than the prior art algorithms based on the $B^1$ basis, since the sub-matrix $Z^{(0,0)}$ shown in Eq. (7) is already known from the solution of the level 0 problem.

However, the preferred embodiment of the present invention utilizes a third basis for solving the refined mesh that is obtained from the hierarchical basis. The new basis is referred to as the "star-loop" basis and is derived from the level 0 and extension basis functions as discussed below. As will be explained in more detail below, the "star" basis functions represent the charge stored on the sub-cells and the loop basis functions represent currents that form loops through the sub-cells.

As noted above, the equivalent circuit for a passive structure such as the interconnection structure shown in FIG. 1 consists of coupled inductors and capacitors. The impedance contribution of the inductors behaves differently than that of the capacitors when viewed as a function of frequency. In the roof-top basis, these contributions are mixed, and hence, the solution has a much more complex frequency dependence, even in the absence of resonance effects. By dividing the problem into an inductive and capacitive problem, the non-resonant frequency dependencies can be substantially reduced, thereby reducing the frequency dependency of the solution to be constructed to adequately describe the passive structure's behavior.

The manner in which the star and loop basis functions are constructed can be more easily understood with reference to creating a hierarchical multi-resolution star-loop basis for a rectangular cell by extending the resolution level (0) basis to level (1). The process may be viewed as consisting of three steps. In the first step, the cells are refined as described above. The basis functions on the refined mesh are then transformed to the multi-resolution basis whose functions are the basis functions on the lower mesh and the extension functions. Finally, the extension functions are transformed to the star-loop basis.

The modeling of the surface current in a rectangular cell with rooftop basis functions has four degrees of freedom, representing the total current flowing through each of the four edges of the cell:

$$J(r) = I_1^{(0)} B_1^{(0)}(r) + I_2^{(0)} B_2^{(0)}(r) + I_3^{(0)} B_3^{(0)}(r) + I_4^{(0)} B_4^{(0)}(r) \quad (9)$$

Taking the divergence of the surface current yields the surface charge. In a rooftop basis, the surface charge density is constant in each cell. This implies that there is only one degree of freedom per cell in the model of the surface charge (charge space). This degree of freedom represents the total charge in the cell:

$$q(r) = \nabla \cdot J(r) = q_1^{(0)} P_1^{(0)}(r) \quad (10)$$

The nullspace of the divergence operator (inductive space) contains the remaining 3 degrees of freedom. In the first step, the rectangular cell is refined into four rectangular cells by bisecting the edges of the cell as described above. In the refined resolution level (1), the surface current model has 12 degrees of freedom, the corresponding model for the surface charge has 4 degrees of freedom.

In the second step, the pulse basis for the surface charge on resolution level (1) is transformed to a new multi-resolution basis, which recovers the degree of freedom on resolution level (0). The 3 remaining degrees of freedom are mutually orthogonal and represent the hierarchical extension of the charge space:

$$\{P_1^{(1)}, P_2^{(1)}, P_3^{(1)}, P_4^{(1)}\} \xrightarrow{transform} \{P_1^{(0)}, Q_1^{(1)}, Q_2^{(1)}, Q_3^{(1)}\} \quad (11)$$

The rooftop basis for the surface currents is transformed accordingly, such that the 4 degrees of freedom on resolution level (0) are recovered. The remaining 8 degrees of freedom represent the hierarchical extension. The associated basis functions are constructed such that each basis function is associated with only one charge function. This allows one to classify the current basis functions into four groups.

$$\{B_1^{(1)}, \ldots, B_{12}^{((1))}\} \xrightarrow{transform}$$

$$\left\{ \underbrace{B_1^{(0)}, \ldots, B_4^{(0)}}_{P_1^{(0)}}, \underbrace{H_1^{(1)}, H_2^{(1)}, H_3^{(1)}}_{Q_1^{(1)}}, \underbrace{H_4^{(1)}, H_5^{(1)}, H_6^{(1)}}_{Q_2^{(1)}}, \underbrace{H_7^{(1)}, H_8^{(1)}}_{Q_3^{(1)}} \right\}$$

In the third step, the multi-resolution rooftop basis of the hierarchical extension is transformed to a star-loop basis. By adding up all rooftop functions belonging to the same charge function, one star function is associated with each degree of freedom in the charge space. The loop basis functions of the inductive space are constructed by subtracting two rooftop functions belonging to the same charge function. For the rectangular cell, this leads to the following star and loop basis functions:

$$Q_1^{(1)} \longleftrightarrow X_1^{(1)} = \frac{1}{3}(H_1^{(1)} + H_2^{(1)} + H_3^{(1)}) \quad L_1^{(1)} = \frac{1}{2}(H_3^{(1)} - H_1^{(1)}) \quad L_2^{(1)} = \frac{1}{2}(H_2^{(1)} - H_3^{(1)})$$

$$Q_2^{(1)} \longleftrightarrow X_2^{(1)} = \frac{1}{3}(H_4^{(1)} + H_5^{(1)} + H_6^{(1)}) \quad L_3^{(1)} = \frac{1}{2}(H_4^{(1)} - H_6^{(1)}) \quad L_4^{(1)} = \frac{1}{2}(H_6^{(1)} - H_5^{(1)})$$

$$Q_3^{(1)} \longleftrightarrow X_3^{(1)} = \frac{1}{2}(H_7^{(1)} + H_8^{(1)}) \qquad L_5^{(1)} = \frac{1}{2}(H_8^{(1)} - H_7^{(1)})$$

The star basis functions build up the capacitive part and the loop basis functions the inductive part of the hierarchical extension on resolution level (1).

Figure 6:
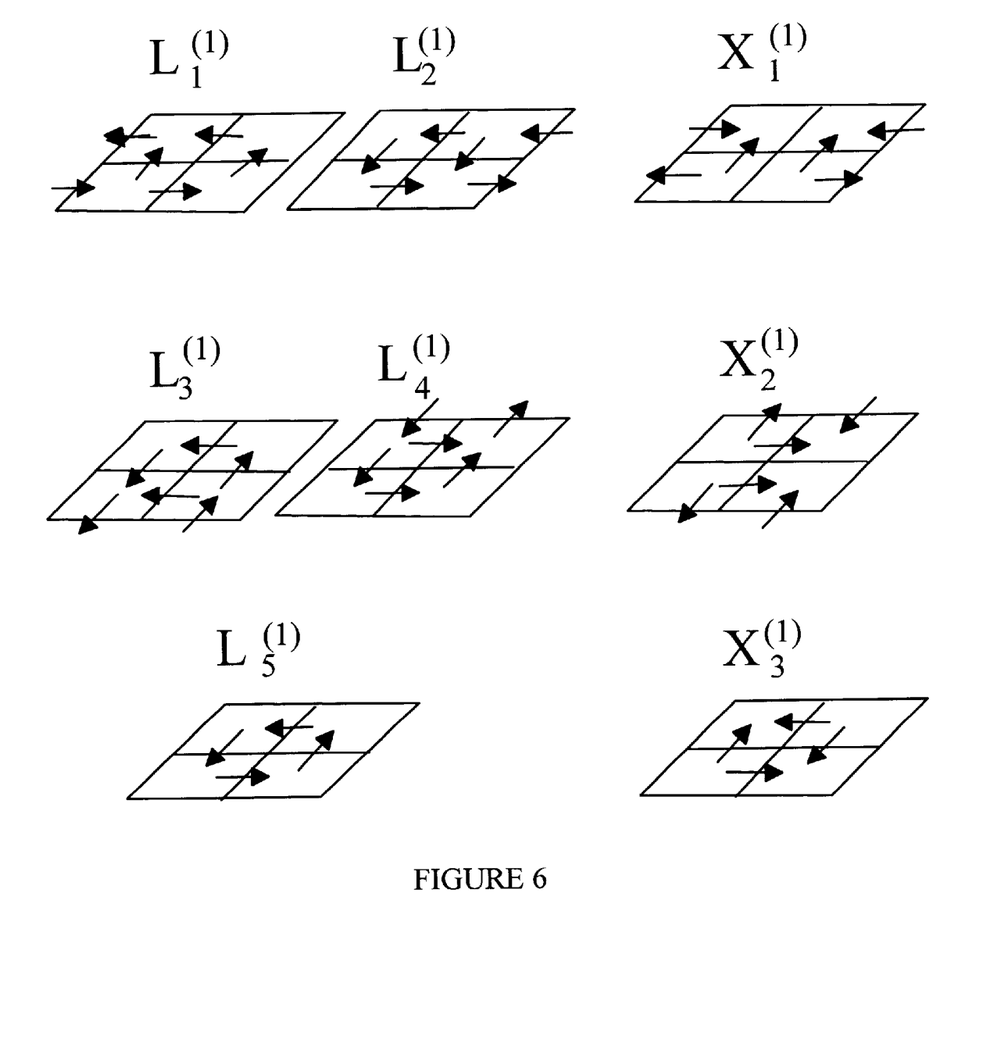
FIG. 6 illustrates the basis functions of the star-loop basis.

The currents represented by the loop basis functions $L^{(1)}_1$–$L^{(1)}_5$ are shown in FIG. 6. $L^{(1)}_1$–$L^{(1)}_4$ correspond to currents that enter one subcell on one side of the level (0) cell, loop through the 4 subcells and leave that side by the other subcell on that side. $L^{(1)}_5$ corresponds to a current that loops within the sub-cells. The current entering the sub-cell is the same as the current leaving the other subcell. That is, the loop basis functions correspond to currents that do not change the charge stored in any of the sub-cells. The currents corresponding to the star basis functions are also shown in FIG. 6. In contrast to the loop basis, the currents represented by the star basis functions do change the stored charge in the sub-cells.

Typically, not all of the basis functions at the refined level are needed to accurately represent the solution at that level. Since the computational workload is a very sensitive function of the number of basis functions needed, the present invention identifies the basis functions that may be eliminated. The present invention utilizes an error estimation process to determine which basis functions are actually needed at the higher resolution level. These basis functions, together with any basis function associated with neighboring cells to which they connect, are then used to solve the problem at level (1). It should be noted that the star basis functions only connect to loop basis functions in the neighboring cells, while the loop basis functions can also connect to the corresponding loop basis functions in the neighboring cells.

The error estimation technique, when increasing the resolution from level (0) to level (1), starts by analyzing the discrete residual error on level (1). The MoM solution on resolution level (0) yields a zero discrete residual error on level (0):

$$[\Delta V^{(0)}] = [V^{(0)}] - [Z^{(0,0)}] \cdot [I^{(0)}] = 0 \quad (12)$$

The discrete residual error at level (1) for the level (0) currents, however, is different from zero and can be calculated as follows:

$$[\Delta V^{(1)}] = [V^{(1)}] - [Z^{(1,0)}] \cdot [I^{(0)}] \quad (13)$$

To assess the reliability of the adaptive refinement process, an a posteriori error estimation is developed using the principle of local reanalysis. This approach assumes that a local change in the mesh size will affect the solution only if the latter was not accurate. Therefore, local reanalysis provides a measure of the sensitivity of the solution to a local refinement of the mesh. Local reanalysis is achieved by looping over the cells on resolution level (0) and refining the current approximation for each cell separately, by assuming that the currents in the other cells remain unchanged. This produces a very small system of equations for each cell:

$$\begin{bmatrix} I^{(0)}_{local} \\ I^{(1)}_{local} \end{bmatrix} = \begin{bmatrix} Z^{(0,0)}_{local} & Z^{(0,1)}_{local} \\ Z^{(1,0)}_{local} & Z^{(1,1)}_{local} \end{bmatrix}^{-1} \cdot \begin{bmatrix} \Delta V^{(0)}_{local} \\ \Delta V^{(1)}_{local} \end{bmatrix} \quad (14)$$

Since the size of the system is small, the system can be solved quickly without significantly increasing the computational workload. Due to the hierarchical multi-resolution nature of the basis functions, the impact of the residual error in the hierarchical extension of resolution level (1) will be more localized as compared to the impact on resolution level (0). Hence, the current solution from the local reanalysis provides a good estimate for the actual solution on resolution level (1).

$$I^{(1)} \approx I^{(1)}_{local} \quad (15)$$

The estimates for the currents on resolution level (1) are transformed into error indicators by taking the norm of the reaction for each degree of freedom. Since the degrees of freedom in the hierarchical extension are split into a capacitive subspace and an inductive subspace, a separate error is obtained for the capacitive and inductive error indicators:

$$(E_Q^{(1)})_j = \|I_Q^{(1)} \cdot \Delta V_Q^{(1)}\|, j=1, \ldots, N_Q^{(1)}$$

$$(E_L^{(1)})_j = \|I_L^{(1)} \cdot \Delta V_L^{(1)}\|, j=1, \ldots, N_L^{(1)} \quad (16)$$

The subscript 'Q' denotes the degrees of freedom in the capacitive subspace, i.e. associated with the star basis functions, the subscript 'L' denotes the inductive degrees of freedom associated with the loop basis functions. As noted above, separation of the inductive and capacitive effects compensates for the different frequency dependencies of the inductive and capacitive elements.

The error indicators determine which basis functions on level (1) play an important role in improving the present estimated solution. The preferred selection criterion utilizes separate threshold values for the capacitive and inductive errors. These follow from the maximum and minimum error indicators and a control parameter f between 0 and 1 (typically 0.25):

$$(E_Q^{(1)})_{threshold} = f(E_Q^{(1)})_{max} + (1-f)(E_Q^{(1)})_{min}$$

$$(E_L^{(1)})_{threshold} = f(E_L^{(1)})_{max} + (1-f)(E_L^{(1)})_{min} \quad (17)$$

The self-adaptive solution refinement strategy is controlled by selecting only the star and loop basis functions on level (1) with an associated error indicator above the threshold value for usage in the next refinement step.

In the preferred embodiment of the present invention, computational workload is further reduced by using a multi-level iterative matrix solution algorithm that exploits the hierarchical multi-resolution nature of the star-loop basis. To simplify the following discussion, the multi-level matrix solution process will be explained for two resolution levels. The extension to more than two resolution levels is straightforward. The interaction matrix equation for two resolution levels is block-partitioned according to the two levels. For any given current vector, define the residual voltage and the residual current vector:

$$\begin{bmatrix} \Delta V^{(0)} \\ \Delta V^{(1)} \end{bmatrix} = \begin{bmatrix} V^{(0)} \\ V^{(1)} \end{bmatrix} - \begin{bmatrix} Z^{(0,0)} & Z^{(0,1)} \\ Z^{(1,0)} & Z^{(1,1)} \end{bmatrix} \cdot \begin{bmatrix} I^{(0)} \\ I^{(1)} \end{bmatrix} \quad (18)$$

$$\begin{bmatrix} \Delta I^{(0)} \\ \Delta I^{(1)} \end{bmatrix} = \begin{bmatrix} Z^{(0,0)} & Z^{(0,1)} \\ Z^{(1,0)} & Z^{(1,1)} \end{bmatrix}^{-1} \cdot \begin{bmatrix} \Delta V^{(0)} \\ \Delta V^{(1)} \end{bmatrix}$$

Figure 7:
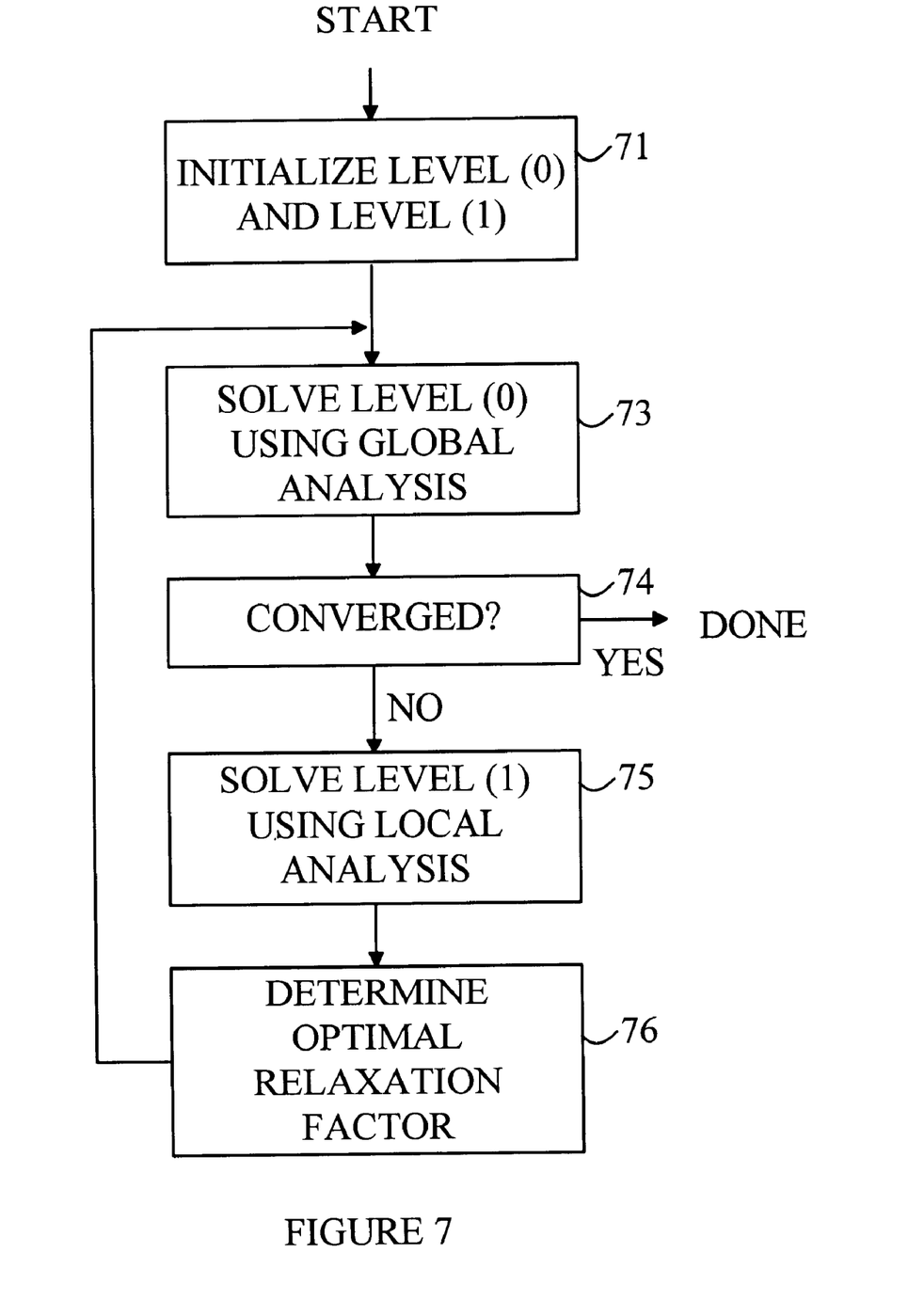
FIG. 7 is a flow chart of a two-level matrix solution algorithm according to the present invention.

Refer now to FIG. 7, which is a flow chart of the two-level matrix solution algorithm. The multi-level matrix solution starts by initializing the current and voltage variables for levels 0 and 1 as shown at 71. Initially, the currents are set to 0, $\Delta V^{(0)} = V^{(0)}$, and $\Delta V^{(1)} = V^{(1)}$. Here, $V^{(0)}$ and $V^{(1)}$ are computed from the applied excitation Y(r) according to Eq. (4). Next, a solution on the lowest resolution level 0 is constructed, neglecting the coupling with the higher resolution level 1 as shown at 73. This step generates new values for the residual currents and voltages:

$$[\Delta I^{(0)}] = [Z^{(0,0)}]^{-1} [\Delta V^{(0)}]$$

$$I^{(0)} \rightarrow I^{(0)} + \Delta I^{(0)}$$

$$\Delta V^{(0)} \rightarrow \Delta V^{(0)} - Z^{(0,0)} \Delta I^{(0)}$$

$$\Delta V^{(1)} \rightarrow \Delta V^{(1)} - Z^{(1,0)} \Delta I^{(0)} \quad (19)$$

In this step, the matrix $Z^{(0,0)}$ is replaced by the LU decomposition.

The current solution is tested for convergence at this point as shown at 74. The solution is assumed to have converged on level 1 if $$\frac{\|\Delta V^{(0)}\| + \|\Delta V^{(1)}\|}{\|V^{(0)}\| + \|V^{(1)}\|} \leq \varepsilon \quad (20)$$

where $\varepsilon$ is a predetermined error constant.

Assuming the solution has not yet converged, the solution process proceeds with the calculation of the current solution on level (1) as shown at 75. The current solution on level (1) is approximated using the local reanalysis process.

$$[\Delta I^{(1)}] = [Z_L^{(1,1)}]^{-1} [\Delta V^{(1)}]$$

$$I^{(1)} \rightarrow I^{(1)} + R \Delta I^{(1)}$$

$$\Delta V^{(0)} \to \Delta V^{(0)} - RZ^{(0,1)}\Delta I^{(1)}$$

$$\Delta V^{(1)} \to \Delta V^{(1)} - RZ^{(1,1)}\Delta I^{(1)} \qquad (21)$$

Here, R is a relaxation factor used to improve the convergence of the algorithm.

The value of R to be used in the next iteration is then determined by finding relaxation factor R that minimizes the norm of the residual voltages on both levels as shown at 76. The process proceeds with cycling over the resolution levels, performing global reanalysis on level (0) and local reanalysis on level (1) and updating the corresponding current solutions and residual voltages, until the convergence criterion given by Eq. (2) is satisfied.

Figure 8:
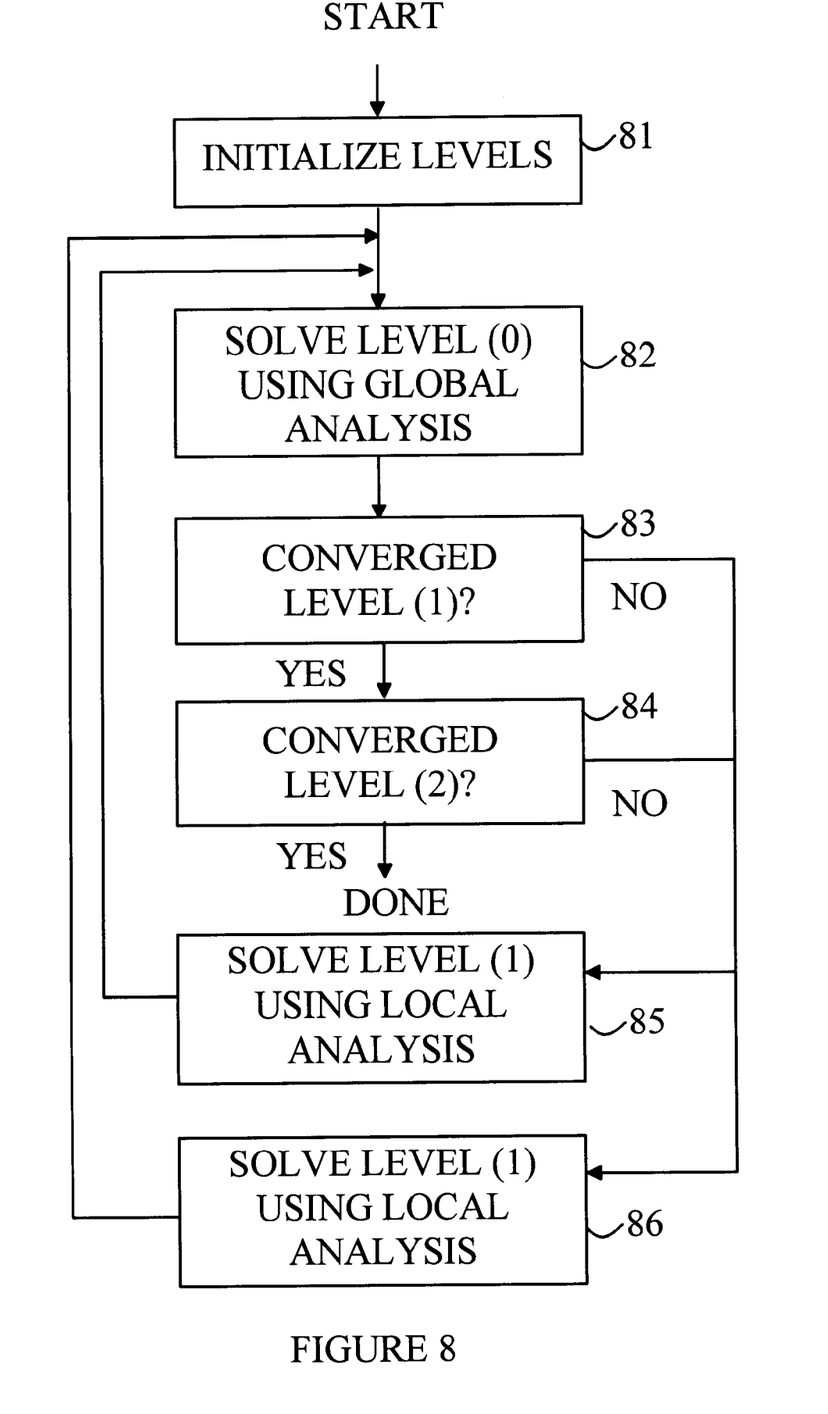
FIG. 8 is a flow chart of a three-level matrix solution algorithm according to the present invention.

The method illustrated in FIG. 7 may be extended to additional levels. When extending this multi-level matrix solution algorithm to more than two levels, the cycling scheme over the different levels is adjusted in such a way that a higher resolution level is only reached when the solution on all the lower resolution levels has converged. Refer now to FIG. 8, which is a flow chart for a three-level matrix solution algorithm according to the present invention. In a manner analogous to that described above, the interaction matrix equation for three resolution levels is block-partitioned according to the three levels. For any given current vector, define the residual voltage and the residual current vector:

$$\begin{bmatrix} \Delta V^{(0)} \\ \Delta V^{(1)} \\ \Delta V^{(2)} \end{bmatrix} = \begin{bmatrix} V^{(0)} \\ V^{(1)} \\ V^{(2)} \end{bmatrix} - \begin{bmatrix} Z^{(0,0)} & Z^{(0,1)} & Z^{(0,2)} \\ Z^{(1,0)} & Z^{(1,1)} & Z^{(1,2)} \\ Z^{(2,0)} & Z^{(2,1)} & Z^{(2,2)} \end{bmatrix} \cdot \begin{bmatrix} I^{(0)} \\ I^{(1)} \\ I^{(2)} \end{bmatrix} \qquad (22)$$

$$\begin{bmatrix} \Delta I^{(0)} \\ \Delta I^{(1)} \\ \Delta I^{(2)} \end{bmatrix} = \begin{bmatrix} Z^{(0,0)} & Z^{(0,1)} & Z^{(0,2)} \\ Z^{(1,0)} & Z^{(1,1)} & Z^{(1,2)} \\ Z^{(2,0)} & Z^{(2,1)} & Z^{(2,2)} \end{bmatrix}^{-1} \cdot \begin{bmatrix} \Delta V^{(0)} \\ \Delta V^{(1)} \\ \Delta V^{(2)} \end{bmatrix}$$

After the current and voltage parameters for the various levels have been initialized as shown at 81, the lowest level is solved utilizing a global analysis as shown at 82. The global analysis neglects the coupling with the higher levels, i.e., $$[\Delta I^{(0)}] = [Z^{(0,0)}]^{-1}[\Delta V^{(0)}]$$

$$I^{(0)} \to I^{(0)} + \Delta I^{(0)}$$

$$\Delta V^{(0)} \to \Delta V^{(0)} - Z^{(0,0)}\Delta I^{(0)}$$

$$\Delta V^{(1)} \to \Delta V^{(1)} - Z^{(1,0)}\Delta I^{(0)}$$

$$\Delta V^{(2)} \to \Delta V^{(2)} - Z^{(2,0)}\Delta I^{(0)} \qquad (23)$$

Then, assuming that level (1) has not converged as defined by Eq. (20), local reanalysis at level (1) is used to update the parameters as shown at 85. The local re-analysis at level (1) updates the parameters as follows:

$$[\Delta I^{(1)}] = [Z_L^{(1,1)}]^{-1}[\Delta V^{(1)}]$$

$$I^{(1)} \to I^{(1)} + R\Delta I^{(1)}$$

$$\Delta V^{(0)} \to \Delta V^{(0)} - RZ^{(0,1)}\Delta I^{(1)}$$

$$\Delta V^{(1)} \to \Delta V^{(1)} - RZ^{(1,1)}\Delta I^{(1)}$$

$$\Delta V^{(2)} \to \Delta V^{(2)} - RZ^{(2,1)}\Delta I^{(1)} \qquad (24)$$

and a new global solution is computed. This process is repeated until convergence is obtained at level (1). At that point, the solution is tested for convergence at level (2). The method has converged at level (2) if $$\frac{\|\Delta V^{(0)}\| + \|\Delta V^{(1)}\| + \|\Delta V^{(2)}\|}{\|V^{(0)}\| + \|V^{(1)}\| + \|V^{(2)}\|} \leq \varepsilon \qquad (25)$$

If the solution has not converged at level (2), local reanalysis at level (2) is used to update the parameters, i.e., $$[\Delta I^{(2)}] = [Z_L^{(2,2)}]^{-1}[\Delta V^{(2)}]$$

$$I^{(2)} \to I^{(2)} + R\Delta I^{(2)}$$

$$\Delta V^{(0)} \to \Delta V^{(0)} - RZ^{(0,2)}\Delta I^{(2)}$$

$$\Delta V^{(1)} \to \Delta V^{(1)} - RZ^{(1,2)}\Delta I^{(2)}$$

$$\Delta V^{(2)} \to \Delta V^{(2)} - RZ^{(2,2)}\Delta I^{(2)} \qquad (26)$$

and a new global solution is computed. The new solution is tested at level (1) for convergence, and the algorithm cycles between level (1) and level (0) until convergence at level (1) is obtained. At this point, convergence for level (2) is tested. The process cycles until convergence at both levels is achieved.

The above-described embodiments of the present invention have utilized a mesh scheme based on rectangular and triangular cells. However, it will be obvious to those skilled in the art from the preceding discussion that other mesh schemes can be utilized. For example, the structure being modeled can be divided into higher order polygons.

Various modifications to the present invention will become apparent to those skilled in the art from the foregoing description and accompanying drawings. Accordingly, the present invention is to be limited solely by the scope of the following claims.

What is claimed is:

1. A method for operating a computer to determine the electrical characteristics of a passive planar structure, said method comprising the steps of:

defining a first mesh on said structure, said first mesh dividing said structure into polygons;

defining a surface current in said structure comprising a first weighted sum of a first set of basis functions;

calculating the weights of said first basis functions in said first weighted sum by solving Maxwell's equations;

refining said mesh by dividing each polygon into a plurality of sub-polygons;

defining said surface current as a second weighted sum of a second set of basis functions, said second set of basis functions comprising said first set of basis functions and a plurality of extension basis functions representing the additional degrees of freedom introduced by said refined mesh; and calculating the weights of said second basis functions in said second weighted sum by solving Maxwell's equations.

2. The method of claim 1 wherein said extension basis functions comprise a capacitative set of basis functions representing the capacitative contribution of said sub-polygons and an inductive set of basis functions representing the inductive contributions of said sub-polygons.

3. The method of claim 2 wherein said step of calculating said weights in said second basis functions comprises solving Maxwell's equations for each polygon in said first mesh structure assuming that the currents in all other polygons in said first mesh structure remain unchanged.

4. The method of claim 3 wherein said step of defining said surface current in said second set of basis functions comprises estimating the contribution of each basis function in said capacitative set of basis functions and removing those basis functions from said capacitative set of basis functions whose contributions are less than a capacitative threshold value.

5. The method of claim 3 wherein said step of defining said surface current in said second set of basis functions comprises estimating the contribution of each basis function in said inductive set of basis functions and removing those basis functions from said inductive set of basis functions whose contributions are less than a inductive threshold value.

6. The method of claim 1 wherein said step of calculating said weights of said second basis functions comprises the steps of:

calculating said weights of said first basis functions neglecting couplings between said first basis functions and said second basis functions; and calculating said weights of said second basis functions corresponding to one of said polygons in said first mesh by assuming that said currents in said other polygons in said first mesh are constant.

\* \* \* \* \*